United States Patent
Verger et al.

[11] Patent Number: 5,854,489
[45] Date of Patent: *Dec. 29, 1998

[54] METHOD AND DEVICE FOR CORRECTION OF SPECTROMETRIC MEASUREMENTS IN THE GAMMA PHOTON DETECTION FIELD

[75] Inventors: Loïck Verger; Jean-Paul Bonnefoy-Claudet, both of Grenoble; Françoise Mathy, Meylan, all of France

[73] Assignee: Commissariat a l'Energie Atomique, France

[ * ] Notice: This patent issued on a continued prosecution application filed under 37 CFR 1.53(d), and is subject to the twenty year patent term provisions of 35 U.S.C. 154(a)(2).

[21] Appl. No.: 713,630
[22] Filed: Sep. 13, 1996

[30] Foreign Application Priority Data

Sep. 15, 1995 [FR] France ................................. 95 10849

[51] Int. Cl.$^6$ ...................................................... G01T 1/24
[52] U.S. Cl. ................................ 250/370.06; 250/370.01; 250/370.13
[58] Field of Search ..................... 250/370.01, 370.06, 250/370.13

[56] References Cited

U.S. PATENT DOCUMENTS 4,727,256  2/1988  Kumazawa .......................... 250/370.01

OTHER PUBLICATIONS

H. L. Malm, C. Canali, J. W. Mayer, M-A. Nicolet, K. R. Zanio, and W. Akutagawa, "Gamma–ray spectroscopy with single–carrier collection in high–resistivity semiconductors." *Applied Physics Letters*, vol. 26, No. 6, pp. 344–346. Mar. 1975.

Riepe et al., "Semiconductor Detectors for Charged Particle Spectroscopy in the 80 MeV Range", *Nuclear Instruments and Methods*, vol. 101, No. 1, May 1972, pp. 77–83. May 1972.

Karlsson, "Particle Identification with a Small Ge(Li) Detector", *Nuclear Instruments and Methods*, vol. 109, No. 1, May 1973, pp. 101–108. May 1973.

Richter, et al., "Pulse Processing for Planar Cadmium Telluride Detectors," *Mat. Res. Soc. Symp.*, vol. 302, pp. 195–203 (1993).

Samimi, et al. "Structural Defects in High Resistivity Cadmium Telluride," *Nuclear Instruments and Methods in Physics Research*, vol. A283, pp. 243–248 (1989).

Marc Cuzin, "CdTe in Photoconductive Applications Fast Detector For Metrology and X–rays Imaging," *Nuclear Instruments and Methods in Physics Research*, vol. A322, pp. 341–351 (1992).

Frederick, et al., "Properties of a New CdTe Detector for Nuclear Medicine," *IEEE Transaction on Nuclear Science*, vol. NS–34(1), pp. 354–358 (1987).

Baba, et al., "A High Speed Cadmium Telluride Radiation Detector," *IEEE Transactions on Nuclear Science*, vol. 40(1), pp. 56–62 (1993).

*Primary Examiner*—Constantine Hannaher
*Attorney, Agent, or Firm*—Burns, Doane, Swecker & Mathis LLP

[57] ABSTRACT

The invention relates to a method and device for using a signal, or a set of data representative of the time variation of a signal output by a semiconductor detector (52), in response to the interaction of a γ photon with the semiconductor material in which a signal or data is produced, being representative of the rise time of the electronic component of the signal output by the detector. The total detected charge may also be measured. Charge-rise time correlation curves are created.

14 Claims, 6 Drawing Sheets

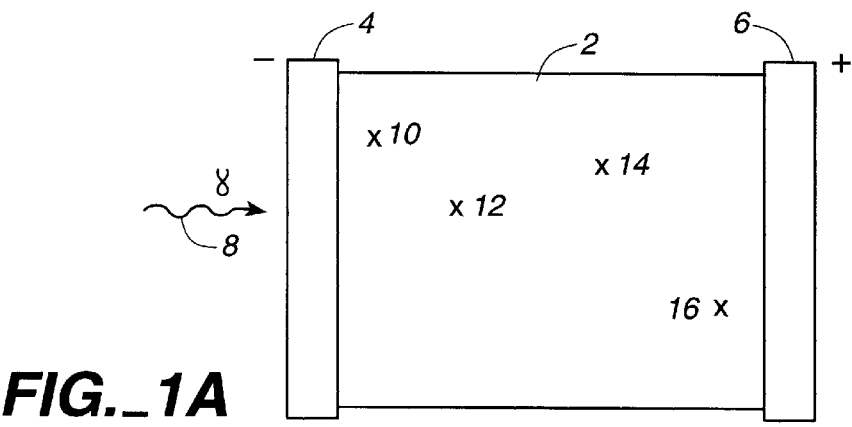
FIG._1A
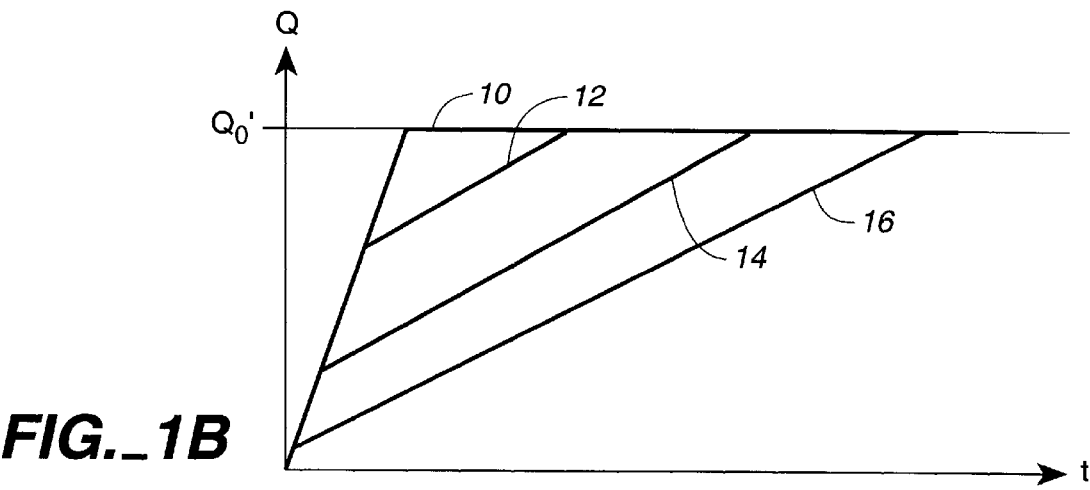
FIG._1B
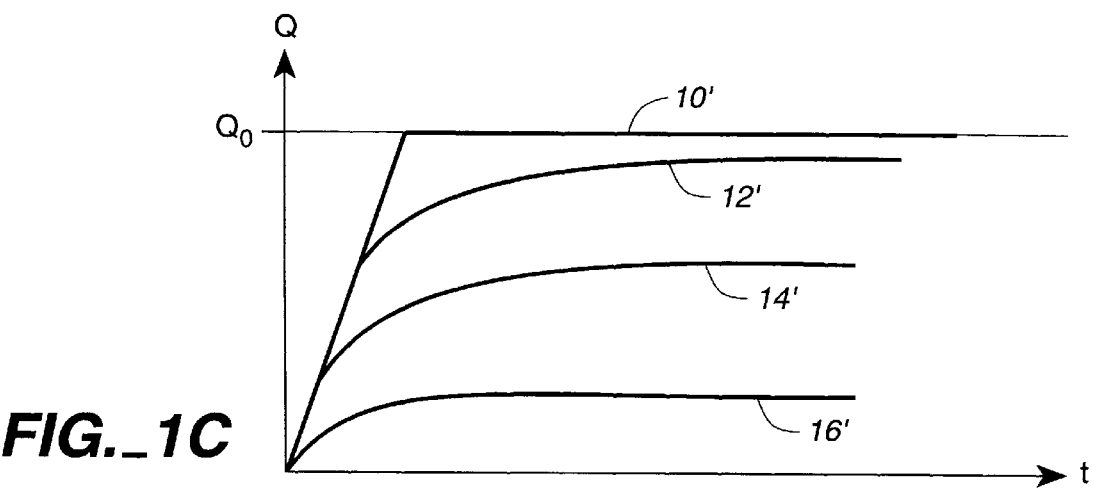
FIG._1C

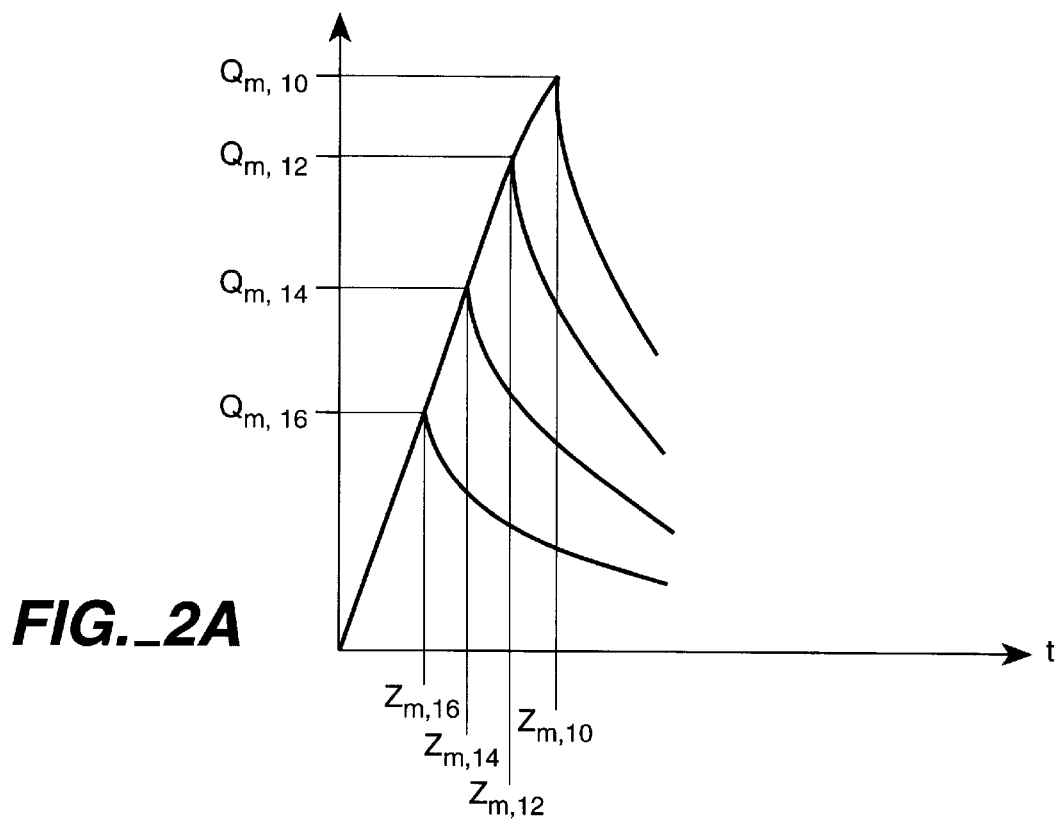
FIG._2A
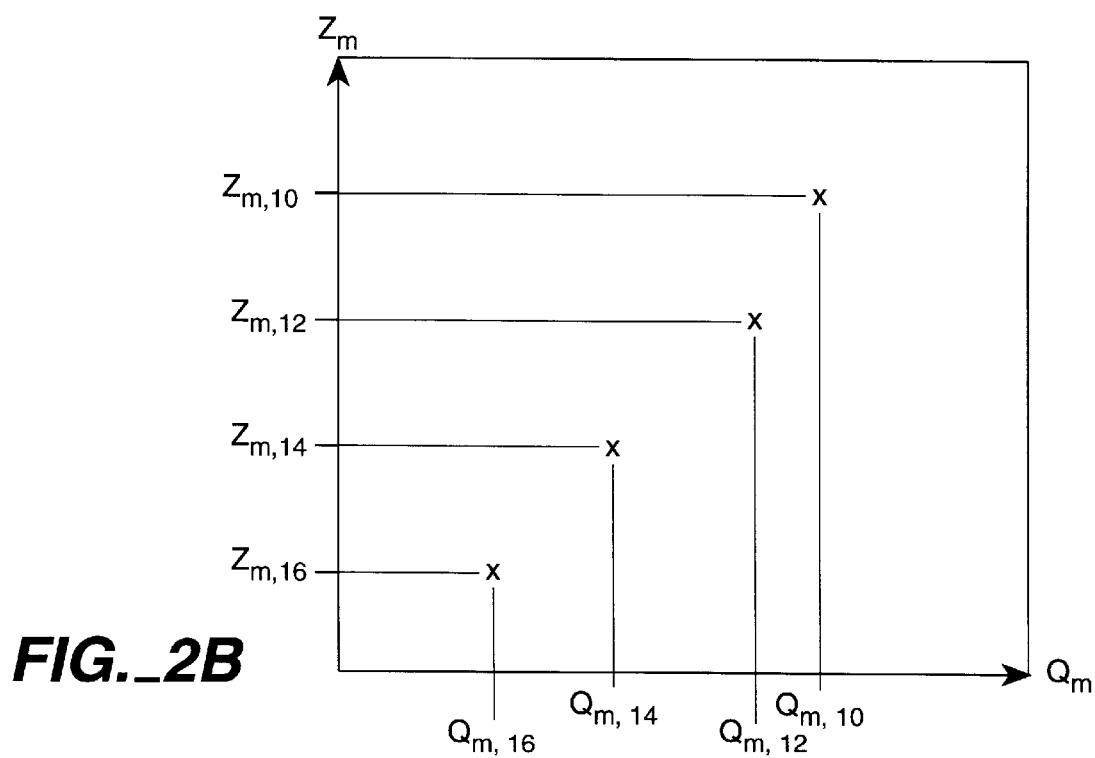
FIG._2B

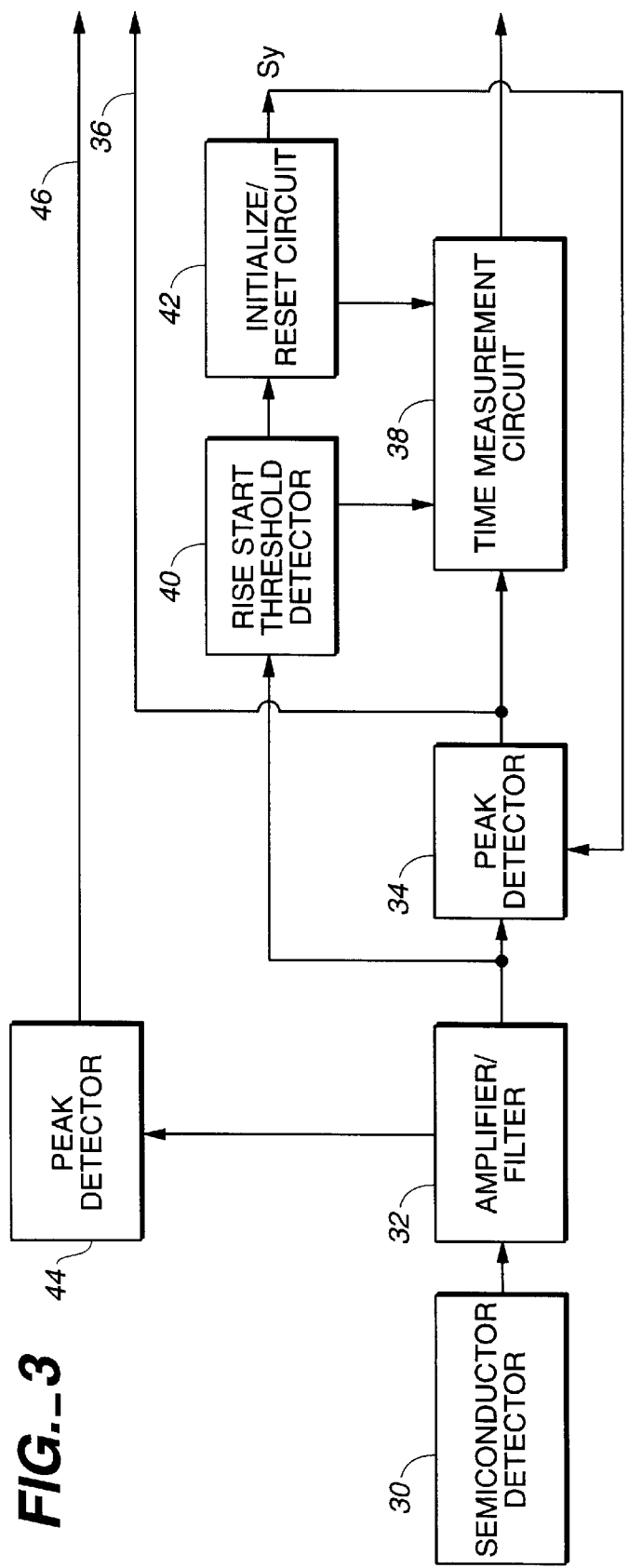
FIG._3

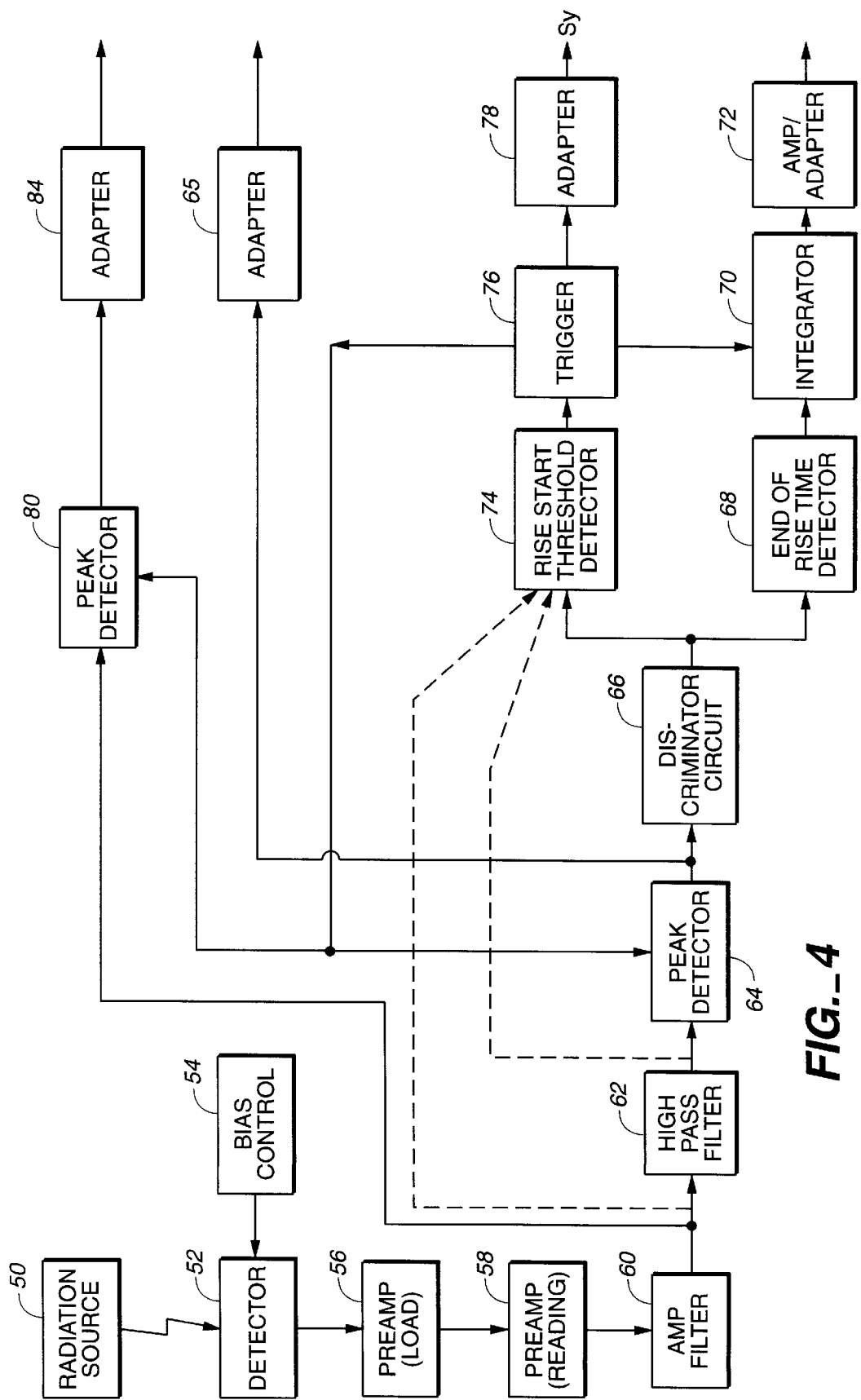
FIG._4

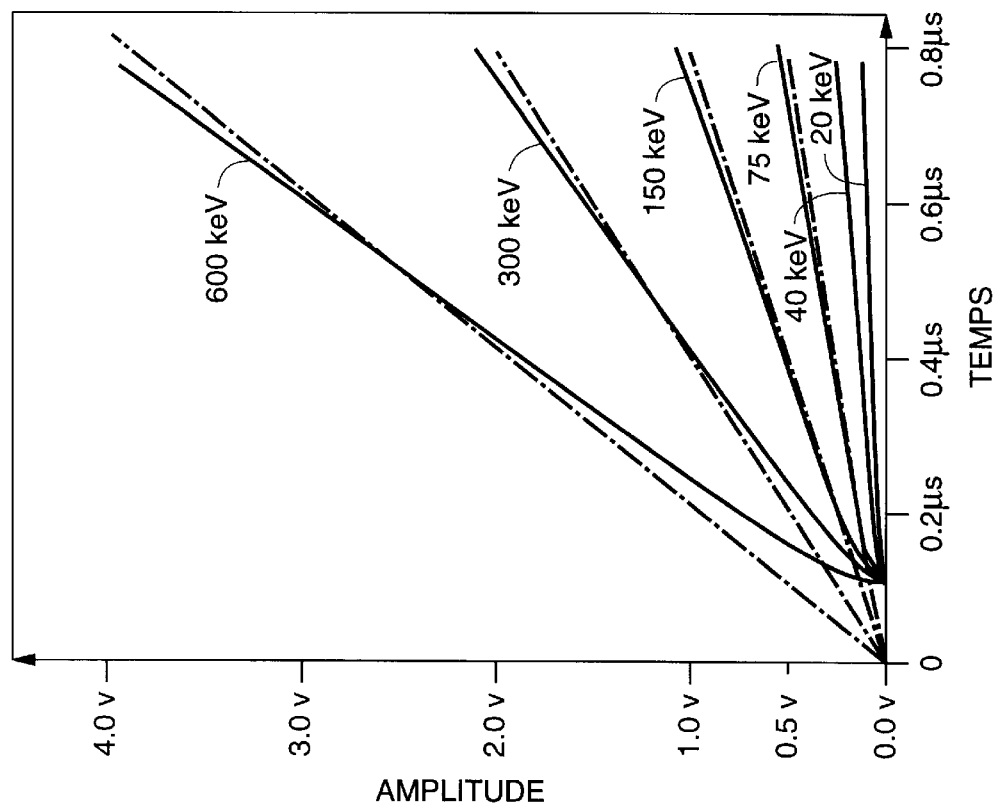
FIG._5B
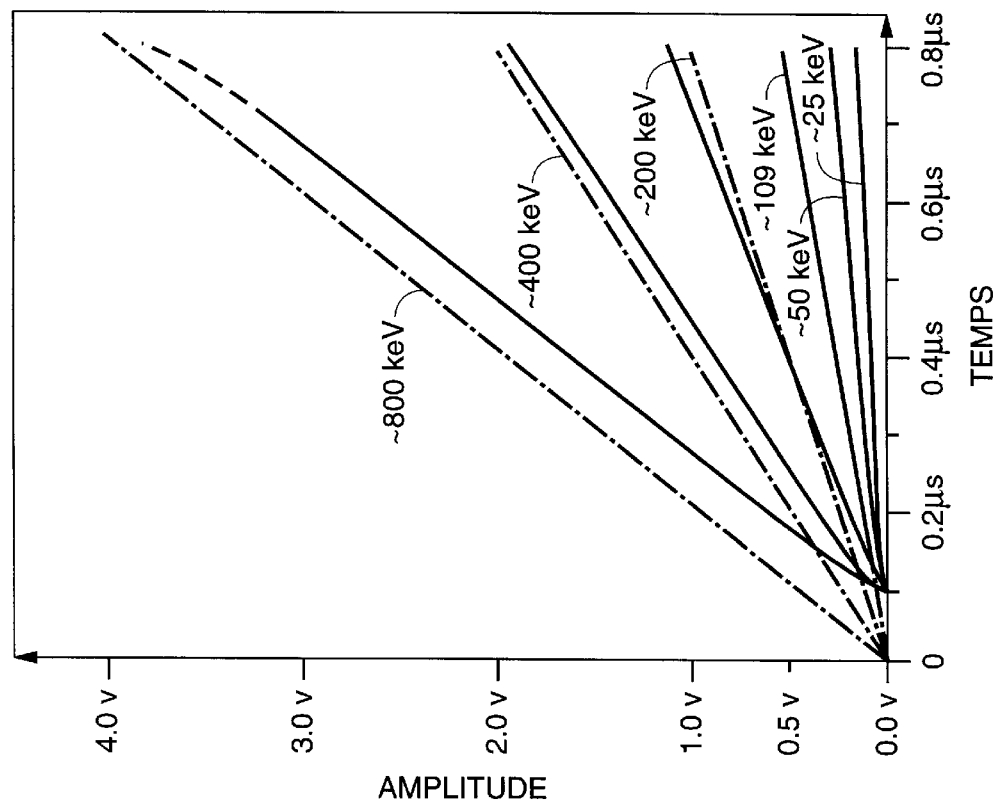
FIG._5A

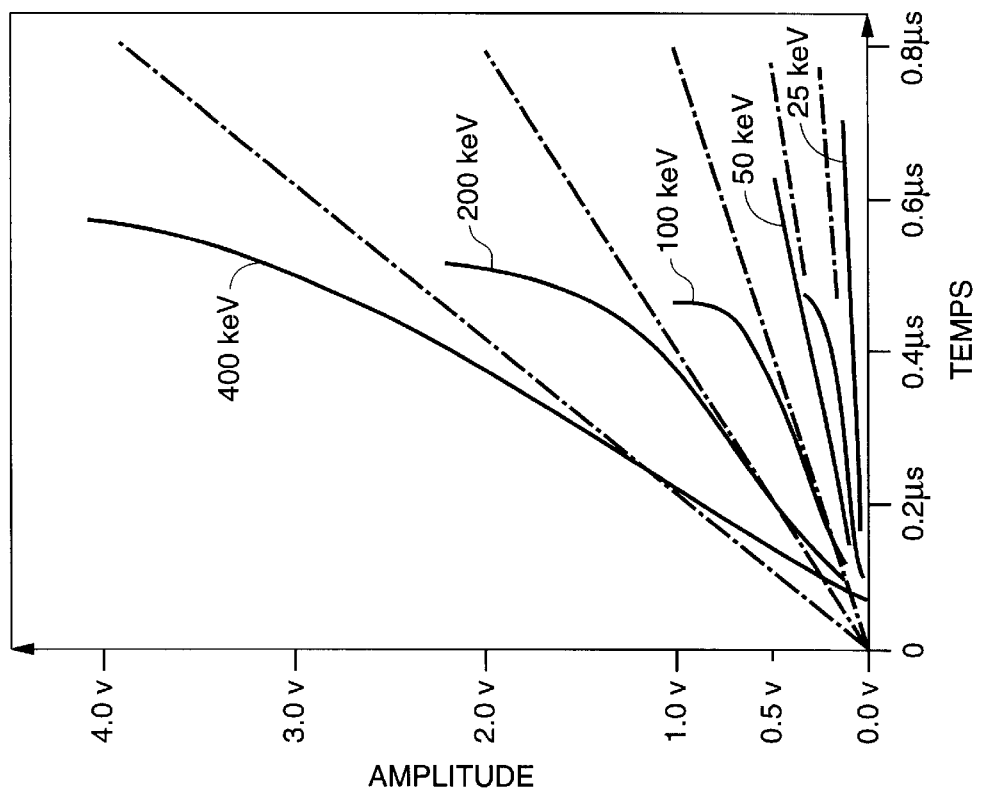
FIG._5D
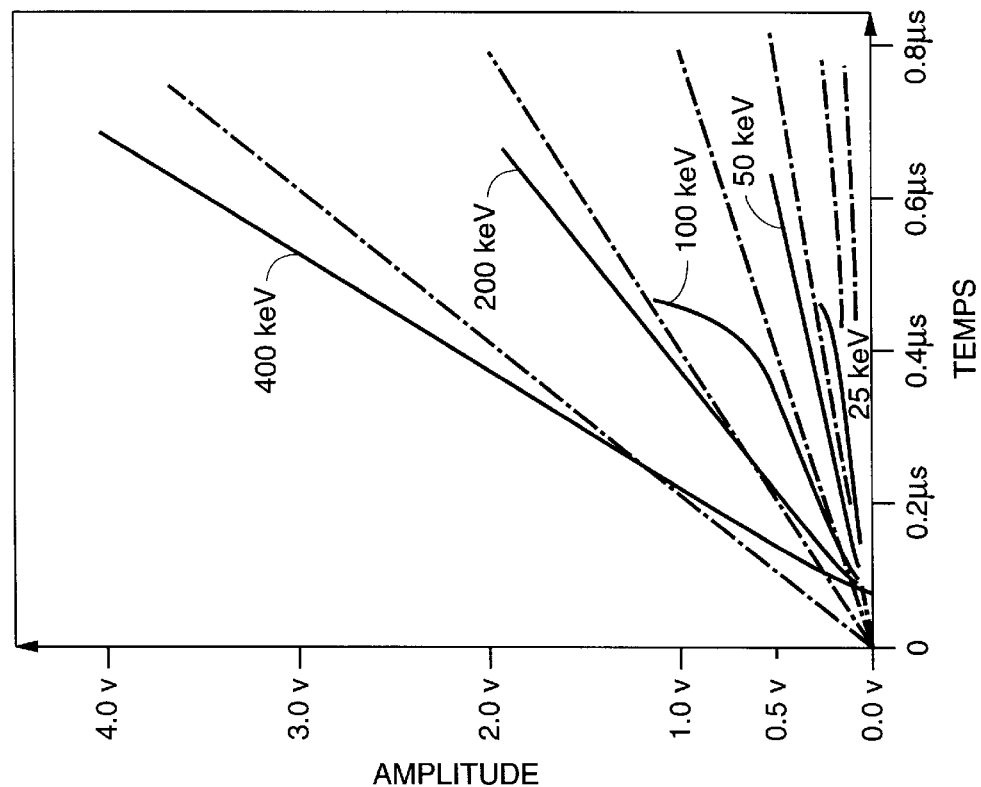
FIG._5C

METHOD AND DEVICE FOR CORRECTION OF SPECTROMETRIC MEASUREMENTS IN THE GAMMA PHOTON DETECTION FIELD

TECHNICAL FIELD AND PRIOR ART

The invention relates to the field of γ radiation detection, the detector used being a semiconductor. It also relates to γ imagery spectrometric measurements.

Many types of detectors have been envisaged for detection of γ radiation. γ radiation detection techniques have been mainly based on the use of solid semiconductor based detectors during the last 30 years.

Semiconductor based detectors directly convert γ radiation in the material into energy, without passing through intermediate steps such as the emission of visible photons in the case of scintillators. This overcomes coupling problems that systematically reduce the efficiency. The energy necessary to create an electron-hole pair in a semiconductor is much lower than in a gas or in a scintillator (about 4 eV in semiconductors, compared with 30 eV in gases and 300 eV in photomultiplier scintillator systems). Consequently, the number of free charges created for each detected photon is larger, which gives better energy resolutions with low noise. Furthermore, the atomic number and the high density of semiconductor materials make it possible to use detection volumes significantly lower than the volumes of gas detectors or scintillators, while maintaining the same quantum detection efficiency.

The use of these semiconductor materials as X or γ radiation detectors implies that two electrical contacts should be deposited on the material surface, and a bias voltage has to be applied to the terminals of these contacts. Charge carriers, i.e. electron-hole pairs created by interaction of the γ photon with the material, will be separated under the action of the electrical field, with electrons migrating towards the positive electrode and holes migrating towards the negative electrode. The capability of these charge carriers to migrate towards the electrodes without being trapped by defects present in the semiconductor material will control the energy resolution of the measured spectrum. This capability, also called the charge carrier transport property, is measured by the mobility and lifetime of electrons and holes.

Nowadays, the performances of γ detectors are limited by the presence of native defects in semiconductors which, by trapping charge carriers during their migration towards electrodes, reduce their lifetime and thus deteriorate the energy resolution of the detector. These native defects systematically appear during the crystallogenesis of the semiconductor material. There is a very large literature about studies of these defects, showing that crystallogenesis of all high resistivity semiconductors capable of operating at ambient temperature is not controlled sufficiently well to eliminate these defects.

A study of the defects for CdTe, is given in the article by M. Samimi et al. "Structural defects in high resistivity Cadmium Telluride" published in Nuclear Instruments and Methods in Physics Research A283, 1989, pages 243 to 248. In the case of CdTe, the poor hole collection efficiency is mainly responsible for the poor detection efficiency of the γ detector.

In order to illustrate this problem in more detail, FIG. 1A shows a γ radiation detector comprising a semiconductor material 2 used as a radiation detector between two electrodes 6 and 4 used as anode and cathode respectively. Incident γ radiation 8 passes through the cathode. Photons may interact with the semiconductor material at different points 10, 12, 14, 16 inside this material.

Firstly consider the ideal case in which charge carriers (electrons and holes) created in the semiconductor after absorption of a γ0 photon are not trapped during their migration to polarized electrodes inducing an electric field in the detector. In this case, immediately after their creation, the migration of carriers will induce a charge that can be measured at the terminals of a capacitance. The total measured charge consists of two parts, one fast part associated with electrons, and the other slower part associated with holes. These differences are related to differences in mobility, values for electrons being of approximately 1000 $cm^2$/volt/second and values for holes being of approximately 100 $cm^2$/volt/second. Depending on the point of interaction of the photon in the semiconductor material 2, one of the two parts will be more or less predominant as can be seen in FIG. 1B, wherein the numbers of the curves corresponds to the point of interaction of the photon with the semiconductor material 2 in FIG. 1A. Nevertheless, regardless of the interaction point, the total measured charge Q is always the same ($Q_0$), and is proportional to the energy of the γ photon that had been absorbed. The only difference between these various curves is the time after which charge $Q_0$ can be measured.

Now consider the real case in which hole transport properties are poor, whereas electron transport properties remain good. The poor efficiency of hole collection makes it difficult to reach the theoretical charge $Q_0$ to be measured for any interaction in which the hole signal will be predominant. As shown in FIG. 1C, wherein curves 10', 12', 14', 16' correspond to interaction points 10, 12, 14, 16 respectively, there will be an attenuation of the signal that will reduce the number of hits measured at the right energy ($Q_0$), and the result will be poor detection efficiency. For an interaction that occurs close to the cathode (point 10 in FIG. 1A and curve 10'), only electrons contribute to the signal. Since their transport property is excellent, there is no attenuation of the measured signal, which reaches the theoretical charge $Q_0$. Only the holes contribute to the signal for an interaction that occurs close to the anode. Their poor transport property attenuates the measured signal, which is far from reaching the theoretical charge $Q_0$.

This forms a loss for a nuclear detector, the objective of which is to detect the maximum number of photons at the right energy, with the best resolution.

There are several ways of compensating for the trapping of charge carriers during their migration.

For example, it is possible to choose the sign of the irradiated electrode in order to optimize the detection efficiency. Thus a detector will be irradiated through its negative electrode in order to minimize the distance traveled by holes within the volume of the detector, and thus to limit their trapping.

Another possibility consists of choosing a specific detector geometry, for example a hemispherical structure limiting the distance traveled by the holes. But this method is not easy to implement, including difficult and expensive technological steps, and cannot be used to make a device for two-dimensional imagery.

In another technique, a selection will be made of interactions of photons with the material that produce limited trapping of carriers. This means selecting interactions close to the irradiated electrode, and for which the electronic signal is predominant. Since electron transport properties are significantly better than hole transport properties, a very good energy resolution is obtained. Unfortunately, this is at the detriment of the quantum detection efficiency, since this selection eliminates interactions that occur remote from the irradiated electrode.

It is also possible to compensate for the poor hole transport properties by measuring the relation existing between the amplitude of the integrated signal for each interaction and their rise time. This method shows that this relation is linear for some CdTe detectors, so that badly collected "pulses" corresponding to low amplitudes and long rise times can be corrected. For this method, refer to the article by M. Richter et al. "Pulse processing for planar Cadmium Telluride detectors", published in Mat. Res. Soc. Symp. Proc., vol. 302, 1993, p. 195–203. To our knowledge, this is the only method at the present time for obtaining CdTe based γ detectors with a good energy resolution and a good quantum detection efficiency. Unfortunately, it does not work for all types of CdTe material (since some crystal drawing methods do not have any amplitude-rise time correlation) and for all CdTe detectors, some physical properties of the detector being necessary.

A final technique consists of compensating for the poor hole transport properties by making a detection structure based on Frisch grids used for gas detectors. This consists of depositing classical contacts (electroless, gold or platinum), with solid surfaces for the cathode (irradiated electrode) and as strips for the anode. Half of the strips are connected together with a lower potential than that of the strips in the other half, which are also connected together. Each of these two potentials is connected to a charge preamplifier in which the charge created by the electron migration towards the anode is integrated. This will be identical on both preamplifiers until electrons reach the anode. However, due to the difference between the two anode potentials, the integrated charge on each preamplifier will be different when the electrons are very close to the anode. With this geometric layout, the difference between the two signals integrated on the two preamplifiers (= useful signal) can be made independent of the location of the photon interaction, since this difference only appears when the electrons are very close to the anode. The results obtained are quite remarkable. Nevertheless, this method has the disadvantage that it imposes two preamplifiers per pixel which makes the electronics design very heavy when making a γ imager composed of thousands of pixels.

All the methods described above have the objective of limiting trapping of holes either by an electric field effect or by a geometric effect, or by measurement of an amplitude-rise time correlation, the detected signal then being the sum of the charge of the hole and the charge of the electron. In the latter case, this correlation is dependent on the hole trapping ratio, and therefore on the quality of the detection material and semiconductor crystals with a perfectly uniform distribution of defects have to be used.

DISCLOSURE OF THE INVENTION

The invention provides a method for using a signal output by a semiconductor detector for γ spectrometry purposes, and which overcomes the problems of poor hole transport properties.

More specifically, the object of the invention is a method for using a signal, or a set of data representative of the time variation of a signal output by a semiconductor detector, in response to the interaction of a γ photon with the semiconductor material, in which a signal or data is produced representative of the rise time of the electronic component of the signal output by the detector, i.e. the component of the total signal that corresponds to the collection of electrons originating from the interaction of each γ photon with the semiconductor material.

This method can provide information that is independent of hole transport properties, for a signal including an electronic component and a hole component. The data, or the signal, representative of the rise time of the electronic component depends only on the mobility of electrons, the detector thickness and the voltage applied to the terminals of the detector electrodes. For a given semiconductor (for example made of CdTe), these parameters vary very little when changing from one semiconductor crystal drawing method to another drawing method. In this way, advantage is taken of the fact that electron mobility is much better than hole mobility.

In one particular embodiment, a data or a signal representative of either the total detected charge, or part of the total charge resulting from the collection of electrons, is produced.

In this way, a data or a signal representative either of the amplitude of the signal output by the detector, or of the amplitude of the electronic component of the signal output by the detector, can be obtained.

Similarly, another object of the invention is a method for using several signals or several sets of data, each of which is representative of the time variation of signals output by a semiconductor detector, each set of data or each signal being used according to a method as described above, and a relation being established firstly between a first set of data representing the rise time, and secondly a second set of data representing total detected charges, or the parts of the total charges resulting from the collection of electrons.

This is used to establish a correlation between the rise times of electronic components of total signals and detected charges, which may be either total charges or charges associated with electronic components.

From this relation, or from this correlation, at least one signal or data representative of the maximum electronic charge or of the maximum charge corresponding to at least part of the first and second sets of data, can be determined.

Thus, for at least part of the first and second sets of data, a maximum, total or electronic charge is identified, which may be associated with this part of the first and second sets of data. Since the system detects the charge(s) in voltage form, the maximum charge or the maximum electronic charge are associated with system output voltages, which themselves correspond to energies in the γ radiation field. Consequently, all pairs of data (rises time, charges) of part of the first and second sets of data are associated with a maximum charge which is the charge that should have been detected if the interaction of each photon with the semiconductor occurred without loss, i.e. essentially without loss of holes. Due to the loss of holes, charges lower than the maximum charge are detected with some dispersion, and the result is a corresponding dispersion in the energy spectrum on the low energy side of the peak corresponding to the maximum electronic charge.

The invention also relates to a method for using signals in γ spectrometry, wherein:

from a signal, or a set of data representative of the time variation of a measurement signal obtained by a semiconductor detector, in response to the interaction of a γ photon to be measured with the semiconductor material, a data or a signal representative of the rise time of the electronic component of the signal output by the detector is produced, i.e. the component of the signal corresponding to the collection of electrons from interaction of the γ photon with the semiconductor material, a signal is produced, representative either of the total detected charge, or of the part of the total charge resulting from the collection of electrons, a maximum electric charge is determined using data on the rise time of the electronic component of the signal, on the total charge detected on the part of the total charge resulting from collection of electrons andfrom a relation or correlation established in accordance with the description above.

Therefore, for each signal detected, in response to the interaction of a γ photon with the semiconductor, the method can be used to associate a maximum charge which is the charge that would be detected if the system operated loss free, with said signal.

From the measurement point of view, firstly the correlation(s) between the rise time of the electronic component of the signals and the charges actually measured may be established, followed by recording of a signal in response to the interaction of the semiconductor with a γ photon, and finally this signal may be processed by measuring the rise time of the electronic component, the corresponding charge, and then deducing a maximum charge from these two parameters, using previously determined correlations. This maximum charge, as described above, corresponds to the energy which should actually be detected if the system operates loss free.

It is also possible to introduce a step during which a correction is made to the measured charge from the maximum charge, the rise time corresponding to this maximum charge, and the actually measured rise time.

The invention also relates to a device for using signals, or a set of data representative of the time variation of a signal output by a semiconductor detector in response to the interaction of a γ photon with the semiconductor material, this device including means for producing data or a signal representative of the rise time of the electronic component of the total signal output by the detector, i.e. the component of the signal corresponding to the collection of electrons generated by the interaction of each γ photon with the semiconductor material.

With this device, the operation method described above can be used, and all advantages associated with it can be obtained.

This device may also include a means for producing a data or a signal representative of either the total detected charge, or of the part of the total charge resulting from the collection of electrons.

Thus, means may be provided to produce a data or a signal representative of an amplitude of the electronic component of the signal or of an amplitude of the total signal.

Another object of the invention is a device for using a plurality of sets of data in γ spectrometry, with each set being representative of the time variation of a signal output by a semiconductor detector, in response to the interaction of a γ photon with the semiconductor material.

Since this device includes means similar to those already described above for using each set of data, and means for establishing a relation between firstly a first set of data representing rise times, and secondly a second set of data representing total detected charges or charges resulting from the collection of electrons.

Means may also be provided for producing a signal or data representative of the maximum electronic charge or the maximum charge corresponding to at least part of the first and second sets of data.

Means may also be provided to correct a charge measured from a maximum charge thus obtained, using the rise time corresponding to this maximum charge and the measured rise time.

BRIEF DESCRIPTION OF THE FIGURES

In any case, the characteristics and advantages of the invention will appear from the following description. This description relates to embodiment examples given by way of non-limitative explanations, with reference to the appended drawings in which:

FIG. 1A shows a detection device and various points of interaction of a γ photon with the semiconductor material, FIG. 1B shows signals corresponding to the time variation of the measured charges for an ideal case, FIG. 1C shows the time variation of measured charges for a real case, FIGS. 2A and 2B show the time variation of the electronic component of the total signal, and the correlation between the measured rise times and the measured charges, respectively, FIG. 3 shows a system for processing pulses output from a γ photon detector, FIG. 4 more precisely shows a processing system for implementing the invention, FIGS. 5A to 5D show rise time-measured amplitude calibration curves.

DETAILED DESCRIPTION OF EMBODIMENTS OF THE INVENTION

The principle of the invention will be described in conjunction with FIGS. 2A and 2B.

Firstly consider the case in which only the electronic signal is present in the measured charge: the total signal then corresponds to its electronic component, i.e. to the signal resulting from the collection of electrons from the interaction of each γ photon with the semiconductor material. In as much as this interaction takes place at different points 10, 12, 14, 16 in the semiconductor material 2 (see FIG. 1A), the maximum measured charge, i.e. the maximum amplitude of the electronic component, depends only on the interaction point 10, 12, 14, 16 within the volume of detector 2. It may indeed be considered that electron transport properties in the semiconductor material are sufficient to have no influence on their detected number. For each interaction point 10, 12, 14, 16 in the semiconductor material, a signal is measured or produced between electrodes 4 and 6 which represents the evolution with time of the charge captured by the electrodes due to the interaction of a γ photon with the semiconductor material. As the interaction point becomes closer to the anode, the amplitude, or the maximum charge, of the produced signal reduces, together with the rise time of this signal; the rise time can for example be defined as being the time necessary to reach the maximum amplitude. Means are provided for processing and analyzing this signal. Data representative of this signal may also be recorded and subsequently processed.

The data pairs $(\tau_m,i, Q_m,i)$ (i=10, 12, 14, 16) thus obtained can be plotted on a $\tau_m$, $Q_m$ curve. This then gives a "two parameter" spectrum giving the amplitude of the measured charge with respect to the rise time. This then creates a relation or correlation between these two parameters.

In general, there is an approximately linear correlation between these parameters for photons with the same energy.

The energy is directly related to the maximum measured charge $Q_0$, also called maximum charge. Therefore a maximum charge or maximum energy corresponding to the load or energy measured for a device operating loss free can be assigned, for each correlation curve. Correlation curves can be plotted for γ radiation with different energies, which may be already known; the corresponding energy is assigned to each curve.

The correlation does not depend on hole transport properties, and therefore it does not depend on the quality of the semiconductor material used. The slope of this linear correlation only depends on the mobility of electrons, the detector thickness and the voltage applied to the terminals of the detector electrodes. For a given semiconductor material, for example CdTe, these three parameters (mobility, thickness, voltage) vary very little when a semiconductor crystal drawing method or any other drawing method is used.

This systematic observation of an amplitude-rise time correlation is not confirmed by the calculation method used by Richter in the document mentioned above. This method uses the hole signal which does not exist in the case of crystals obtained by some drawing methods. Furthermore, even if this signal does exist, it depends on a parameter, namely the lifetime of holes, which is very variable and is therefore difficult to reproduce, the lifetime of holes varying considerably along the drawing center line of an ingot. This lack of reproducibility requires the preselection of detectors, and this is a heavy and expensive operation, both in material and in equipment.

Knowledge of a correlation between the amplitude of the electronic signal and its rise time can be used to correct any interaction that subsequently occurs in the detector. Following this type of interaction, a signal or set of data is obtained, reproducing the variation of a charge at the semiconductor terminals as a function of time. The rise time of the signal, or a signal or data representative of this rise time, is produced. A signal or data representative of the detected charge $Q_m$, i.e. the signal amplitude, is also produced. A network of curves plotted in the Q,τ plane is used to deduce the maximum charge $Q_0$ of the corresponding electronic component, which is directly related to the energy of the γ photon which produced the interaction. Even if the maximum actually measured charge $Q_m$ is not equal to the maximum charge $Q_0$ which could have been measured if the interaction took place close to the cathode, this maximum charge $Q_0$ can be deduced using Q,τ correlation curves.

Instead of a network of curves, all data concerning correlations (curves, energies) can be stored in storage means, for example in a conventional computer. A $(Q_m, \tau_m)$ measurement can then be assigned to a curve and to a given energy by computer, for example using the same computer specially programmed for this purpose. Data display means may also be provided, for example in graphic form.

It is then possible to make a correction, either by dedicated electronics or by computer. Therefore in any case, the principle consists of measuring the signal rise time and its amplitude, and obtaining the maximum amplitude that should have been measured using knowledge of the relation or correlation between the measured charges and the rise times.

Thus if the established correlation is linear, charge $Q_c$ obtained by correction is given by the relation:

$$Q_c = Q_m \cdot \tau_0 / \tau_m,$$

where $Q_m$ represents the measured charge, $\tau_m$ represents the measured rise time of the electronic component and $\tau_0$ is the rise time associated with the maximum charge $Q_0$ obtained after comparison of the measurement pair $(\tau_m, Q_m)$, with previously determined relations or correlations.

The above considered the case of a semiconductor material in which only the subsistent electronic signal was considered. However, the method described above is also applicable to semiconductor materials for which the hole signal exists, even if it is very small. In this case, the signal includes firstly an electronic component which corresponds to the collection of electrons, and secondly a hole component which corresponds to the collection of holes. The electronic component may be isolated or identified, for example by temporal differentiation or filtering. This is equivalent to the previous case, in which only the electronic signal exists: the amplitude of the measured signal $Q_m$, and the measured rise time $\tau_m$ of the electronic component are identified, and these results are compared with the correlations.

In order to obtain a higher signal-to-noise ratio, it is also possible to measure the amplitude of the total signal (electronic component+hole component) and the rise times of the electronic component, and to compare these data with a previously established correlation between the total amplitude of signals and the rise time of the electronic components of these signals. In this case, correlations may no longer be linear but as already said, the signal/noise ratio is higher. Thus, the total maximum charge that should have been measured if the interaction took place close to the cathode, is obtained.

FIG. 3 diagrammatically shows a system for using signals obtained in γ spectrometry, which can enable to implement the invention. In this Figure, numeral 30 generally refers to an experimental irradiation bench, i.e. a semiconductor crystal and electrodes (cathode and anode) placed so as to detect a signal in response to an interaction of a γ photon with this semiconductor material. Numeral 32 refers to a complete assembly that can read, amplify and shape the electric signal. This shaping may consist of filtering the global signal obtained at the output of the detectors, to isolate the electronic component thereof. Means 34 are means to detect the maximum amplitude, or peak, of the input signal. If the electronic part of the signal is supplied as an input into these means 34, they will produce an output signal when the maximum load $Q_m$ of the electronic component is detected. A signal representative of this maximum charge and/or corresponding data, may be produced at output 36. Furthermore, a device 38 is also provided to measure the rise rime of the selected signal, i.e. the electronic component. This measurement device is controlled firstly by means 40 for detecting a rise start threshold, and by means 34 for detecting the peak. Pulses output by these two means 34, 40 delimit a time interval. Means 38 produce an output signal or data representative of this time interval. Means 40 also transmit a pulse or a signal to means 42, which initialize a measurement sequence and reset the peak detector 34 to zero at the end of the sequence, ready for a new sequence.

According to one alternative of this device, means 44 may be provided to detect a peak in the total signal (electronic component + hole component). In this case, these peak detection means will produce a signal on an output 46, for example a voltage, representative of the maximum amplitude of the total signal.

The diagram in FIG. 4 shows a data processing system for implementing a method according to the invention, in more detail. In this Figure, numeral 50 refers to a radiation source that supplies γ photons towards a semiconductor detector 52, for example a CdTe detector. Other detectors may be used in the scope of the invention, particularly type IV, (Si, Ge, etc.), type-II–IV (ZnS, etc.), type III–V (GaAs, InP, etc.) or II–VII (HgI$_2$, etc.) based semiconductors.

Means 54 are also provided to choose the bias of the detector.

Charges are collected in response to the interaction of a γ photon with the semiconductor material of detector 52. The signal corresponding to the collected charges is available at the output from a load preamplifier 56, for example an eV 5093 preamplifier.

The output signal from the load preamplifier 56 is transmitted to a reading preamplifier 58, for example in which the gain may be adjusted between 1 and 3. Means may also be provided for adjusting the signal polarity. Means 60 combine an amplifier and a low pass filter. The low pass filter rejects all DC components.

The amplified and filtered signal is then input to a high pass filter 62. This filter rejects the slow signal, i.e. the slow component of the signal due to holes. Therefore, the output is a signal that corresponds to the electronic component of the total signal.

The time constant for the high pass filter 62 is chosen to be very small compared with the hole collection time and higher or equal or comparable to the electron collection time.

A signal representing the time variation of the electronic component alone is therefore transmitted to a peak detector 64 at the output of which is connected a rise discriminator 66 towards the signal peak. For this rise discriminator, a transistor, for example a 2N 2894 transistor, loads a capacitor until the signal peak level. A voltage is observed at the terminals of the collector resistance, indicating that the transistor is loading the capacitor. After the signal peak has passed, loading is stopped and the collector voltage drops is canceled.

The signal obtained at the output from discriminator 66 is transmitted to means 68 which can determine the end of rise time $t_1$ of the electronic component of the total signal. The collector voltage of discriminator 66 transistor is applied to a comparator. Consequently during loading, i.e. during the rise of the electronic component, a current of about 2 milliamperes is supplied as input to an integrator 70, the integration capacity of which is selected at the same time as the constant for the high pass filter 62. Logic signals control the integration phase. An amplifier-adapter 72 follows the integrator and outputs a signal or a voltage proportional to the fast migration time which is a good approximation of the electron collection time, i.e. the rise time of the electronic component.

The discriminator 66 output signal, or the preamplified and filtered signal, taken at the output from means 60 or 62, also triggers means 74 for detecting the signal rise start threshold. This is done by comparing the preamplified and filtered signal with a low threshold. When this low threshold is exceeded, an output signal is transmitted from means 74 to means 76 of triggering an integration sequence in time and resetting the integrator 70 at the end of the sequence. Similarly, these means 76 transmit a reset signal to peak detector 64 at the end of the sequence. An adapter 78 at the output from means 76 generates a synchronization signal $S_γ$.

The peak detector 80 takes a signal at the output from the amplifier-low pass filter assembly 60. This peak detector 80 may be composed similarly to detector 64. At the output from each of these detectors 64, 80, an adapter 65, 84 can obtain a signal representative of the amplitude, i.e. the charge, of the electronic component of the total signal, or the total signal itself (electronic component+hole component).

FIGS. 5A to 5D present electronic component amplitude-rise time relations for signals obtained in the case of a CdTe detector. A maximum amplitude is assigned to each correlation straight line or curve. Furthermore since the amplitude of the signal is proportional to the energy of the γ photon, each curve can be configured by the energy of a γ photon.

The results shown in FIG. 5A are obtained with a filter constant (filter 62) of 0.5 μs. In FIGS. 5B, 5C and 5D, this time constant is equal to 0.2 μs, 0.1 μs and 0.05 μs respectively. For filter constants lower than or equal to 0.1 μs, some curves obtained may not be straight due since the circuit is unable to measure long times (exceeding 0.4 μs). In all cases, the estimate of the energy obtained is approximate (±5%). However, it is clear that after establishing these correlation straight lines, a signal obtained at the output of a semiconductor detector can be processed: this signal is filtered to isolate its electronic component, and the maximum amplitude and the rise time of this electronic component are measured. These two parameters are plotted on the corresponding amplitude-time curve, and the energy of the γ photon which interacts with the semiconductor material to provoke the total signal, is deduced.

It is therefore possible to correct the spectrum obtained: a γ photon for which the interaction with the semiconductor material took place at an arbitrary point inside this material will thus be assigned a unique energy independent of its trajectory within the semiconductor. If this processing was not done, the total measured charge, i.e. the maximum total amplitude actually measured for the signal would produce a lower energy measurement than the measurement obtained using the correlation method described above: thus the corresponding peak in the spectrum would be widened on the low energy side.

The Richter correction methods described in the document mentioned above can be compared with the methods described in this invention. These methods were applied on CdTe material drawn using two different drawing methods, firstly the THM (Traveling Heater Method) and the HPBM (High Pressure Bridgman Method).

In the case of the Richter method, the total signal rise time is plotted as the ordinate of a graph, and the amplitude of the total signal (total charge) is plotted as the abscissa on the same graph. In the method according to the invention, the rise time of the electronic component of the total signal is plotted as the ordinate, and the amplitude of the same electronic component is plotted as the abscissa. In all cases, a cluster of points is obtained: points obtained with the method according to the invention show a linear correlation of the two parameters (rise time and charge) whereas this correlation is much less clearly defined by the Richter method using a material obtained by THM and is non-existent in the case of the Richter method with a material obtained by HPBM.

The possibility of compensating for the poor detection efficiency using the electronic signal component opens up the way to many applications, particularly in nuclear medicine. The physical criteria for making a semiconductor based γ camera (100% detection efficiency, very high energy resolution) are very severe, and previously known correction methods could not satisfy these criteria. The high required detection efficiency imposes the use of thick detectors (about 5 to 6 mm of CdTe) for which no known correction method can be efficiently applied.

This is not the case for this invention, to the extent that the linear correlation does not depend on probabilistic phenomena (such as hole trapping) but only on known and constant parameters (electron mobility, detector thickness, bias voltage). In this case, the use of thick detectors is not a disadvantage: on the contrary, it makes it possible to measure much longer rise times which, on an electric point of view, are easier to measure.

We claim:

1. Method for detecting a γ radiation with a semiconductor detector having a cathode and an anode comprising the steps of:

detecting a signal in response to an interaction of a γ photon of energy E with said semiconductor detector, said signal having an electronic component corresponding to the collection of electrons of electron hole pairs induced by said γ photon in said semiconductor detector;

producing a signal representative of a rise time of said electronic component;

producing a signal representative of an amplitude of said electronic component;

comparing said signals, representative of a rise time and an amplitude of said electronic component, with a set of data representing a correlation between rise times of electronic components and total charges resulting from collection of electrons; and identifying the energy E of said γ photon.

2. Method according to claim 1, said set of data, representing a correlation between the rise times of electronic components and total charges resulting from collection of electrons or the total detected amplitude of detected signals, having a maximum charge and a corresponding rise time, said energy E being calculated from;

said maximum charge and said corresponding rise time; and said rise time of said electronic component.

3. Method according to claim 1, said signal detected in response to an interaction of a γ photon with said semiconductor detector having an electronic and a hole component, the electronic component being isolated before producing said signal representative of a rise time of said electronic component.

4. Method according to claim 1, said signal detected in response to an interaction of a γ photon with said semiconductor detector having an electronic and a hole component, the electronic component being isolated at an output of said semiconductor detector.

5. Method for detecting a γ radiation with a semiconductor detector having a cathode and an anode, comprising the steps of:

detecting a signal in response to an interaction of a γ photon of energy E with said semiconductor detector, said signal having an electronic component corresponding to the collection of electrons of electron-hole pairs induced by said γ photon in said semiconductor detector;

producing a signal representative of a rise time of said electronic component;

producing a signal representative of an amplitude of said detected signal;

comparing said signals, representative of a rise time of said electronic component and an amplitude of said detected signal, with a set of data representing a correlation between the rise times of electronic components and the total detected amplitude of detected signals; and identifying the energy E of said γ photon.

6. Method according to claim 5, said set of date, representing a correlation between the rise times of electronic components and total charges resulting from collection of electrons or the total detected amplitude of detected signals, having a maximum charge and a corresponding rise time, said energy E being calculated from;

said maximum charge and said corresponding rise time; and said rise time of said electronic component.

7. Method according to claim 5, said signal detected in response to an interaction of a γ photon with said semiconductor detector having an electronic and a hole component, the electronic component being isolated before producing said signal representative of a rise time of said electronic component.

8. Method according to claim 5, said signal detected in response to an interaction of a γ photon with said semiconductor detector having an electronic and a hole component, the electronic component being isolated at an output of said semiconductor detector.

9. Device for detecting a γ radiation, comprising:

a semiconductor detector, for outputting a signal in response to the interaction of a γ photon of energy E with said detector, said signal having an electronic component corresponding to the collection of electrons of electron-hole pairs induced by said γ photon in said detector;

means for producing a signal representative of the rise time of said electronic component; and means for producing a signal representative of an amplitude of said electronic component.

10. Device according to claim 9, said signal detected in response to an interaction of a γ photon with said semiconductor detector having an electronic and a hole component, said device also comprising filtering means for filtering the said signal and for isolating said electronic component thereof.

11. Device for detecting a γ radiation, comprising:

a semiconductor detector, for outputting a signal in response to the interaction of a γ photon of energy E with said detector, said signal having an electronic component corresponding to the collection of electrons of electron-hole pairs induced by said γ photon in said detector:

means for producing a signal representative of the rise time of said electronic component;

means for producing a signal representative of an amplitude of said electronic component;

means for comparing said signals, representative of a rise time and an amplitude of said electronic component, with a set of data representing a correlation between rise times of electronic components and total charges resulting from collection of electrons; and means for producing a signal representative of the energy E of said γ photon.

12. Device for detecting a γ radiation comprising:

a semiconductor detector, for outputting a signal in response to the interaction of a γ photon of energy E with said detector, said signal having an electronic component corresponding to the collection of electrons of electron-hole pairs induced by said γ photon in said detector;

means for producing a signal representative of the rise time of said electronic component; and means for producing a signal representative of an amplitude of said detected signal.

13. Device according to claim 12, said signal detected in response to an interaction of a γ photon with said semiconductor detector having an electronic and a hole component, said device also comprising filtering means for filtering the said signal and for isolating said electronic component thereof.

14. Device for detecting a γ radiation comprising:

a semiconductor detector, for outputting a signal in response to the interaction of a γ photon of energy E with said detector, said signal having an electronic component corresponding to the collection of electrons of electron-hole pairs induced by said γ photon in said detector;

means for producing a signal representative of the rise time of said electronic component;

means for producing a signal representative of an amplitude of said detected signal means for comparing said signals, representative of a rise time of said electronic component and an amplitude of said detected signals, with a set of data representing a correlation between rise times of electronic components and the total detected amplitude of detected signals; and means for producing a signal representative of the energy E of said γ photon.

* * * * *